United States Patent [19]

Butkus

[11] Patent Number: 4,677,784

[45] Date of Patent: Jul. 7, 1987

[54] FISHING ROD HOLDER AND ALARM

[76] Inventor: Joseph S. Butkus, 1512 S. Indian Pl., North Brunswick, N.J. 08902

[21] Appl. No.: 842,273

[22] Filed: Mar. 21, 1986

[51] Int. Cl.$^4$ .............................................. A01K 97/12
[52] U.S. Cl. .......................................... 43/16; 43/21.2
[58] Field of Search ............................ 43/16, 17, 21.2; 403/108, 109; 248/511, 530

[56] References Cited

U.S. PATENT DOCUMENTS

| | | | |
|---|---|---|---|
| 2,818,290 | 12/1957 | Harocopo | 403/108 |
| 3,646,697 | 3/1972 | Jennings | 43/21.2 |
| 3,835,568 | 9/1974 | Whitfield | 43/17 |
| 3,903,633 | 9/1975 | Hutcherson | 43/17 |
| 4,092,795 | 6/1978 | Bryant | 43/17 |
| 4,334,377 | 6/1982 | Hartwig | 43/16 |
| 4,510,709 | 4/1985 | Melcher | 43/21.2 |
| 4,524,475 | 6/1985 | Valentino | 403/85 |

FOREIGN PATENT DOCUMENTS 670894 9/1963 Canada ................................ 248/530

Primary Examiner—Gene P. Crosby
Attorney, Agent, or Firm—Abraham Wilson; Robert A. Green

[57] ABSTRACT

A fishing rod holder includes a tubular member adapted to be pushed into the ground adjacent to a fishing area. The tubular member carries an adjustable ring which can support a fishing rod at selected levels and it also carries an alarm for detecting when a fish moves the fishing rod. This alarm includes a half-ring which is held in a slot in the wall of the tubular member and is spring biased away from an alarm but when a fish moves the rod, the halfpring is pushed into position in which it trips the alarm.

7 Claims, 8 Drawing Figures

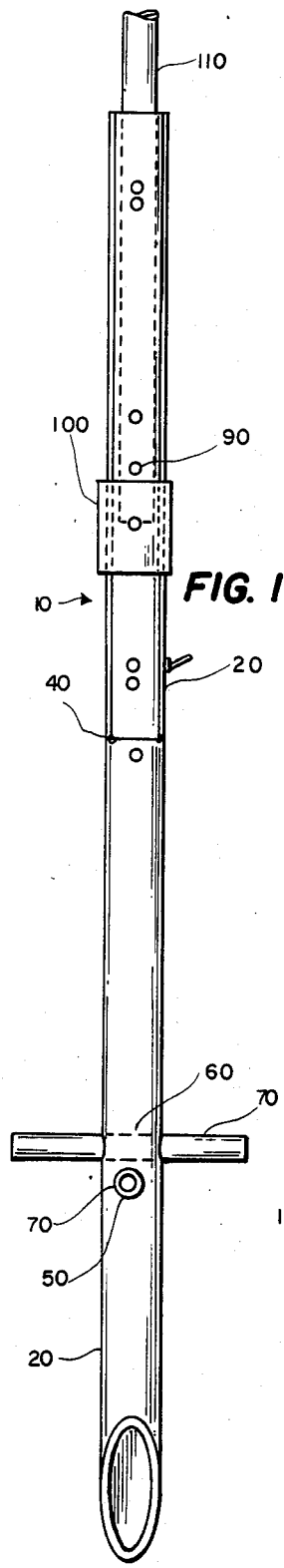
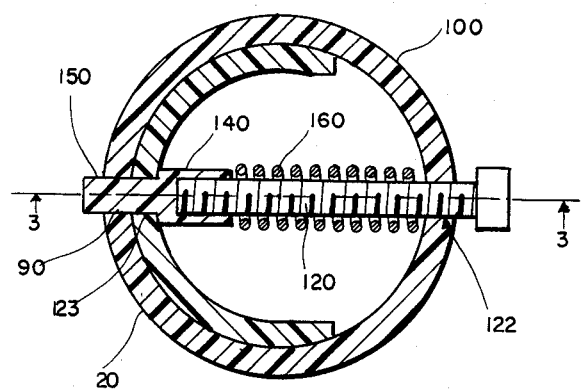
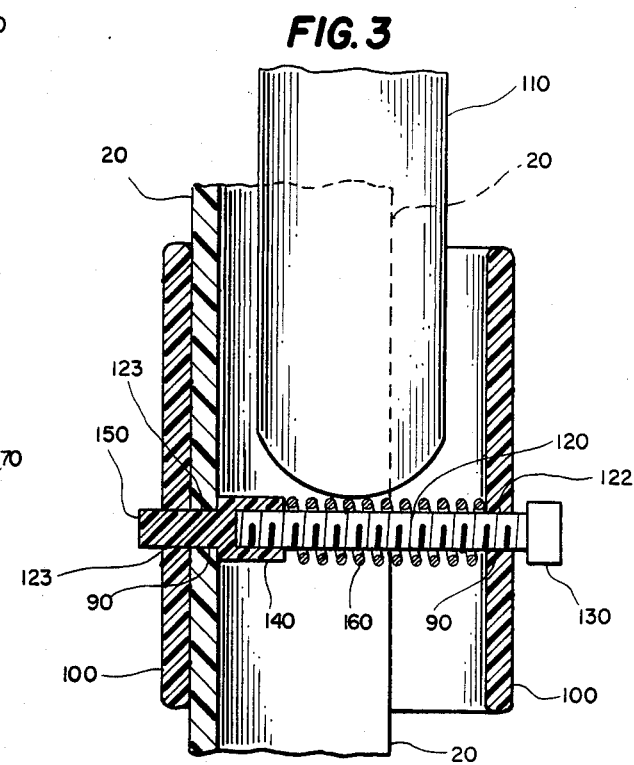

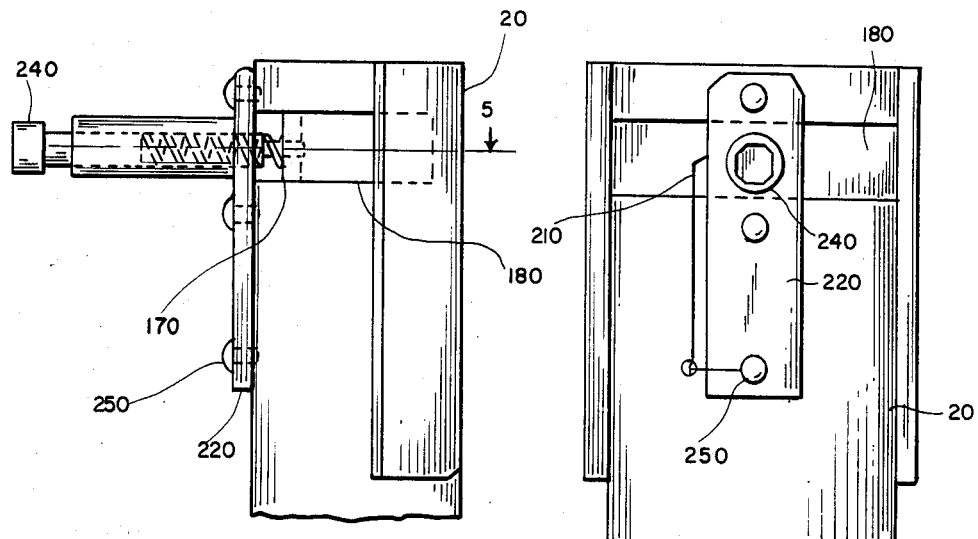
FIG. 4
FIG. 6
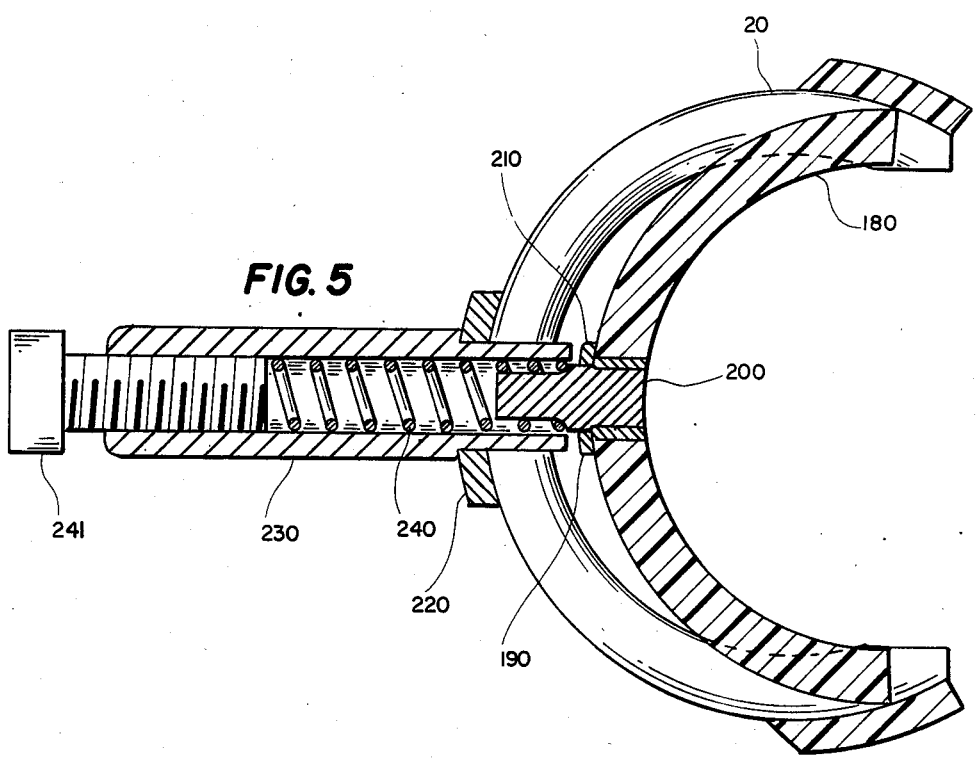
FIG. 5

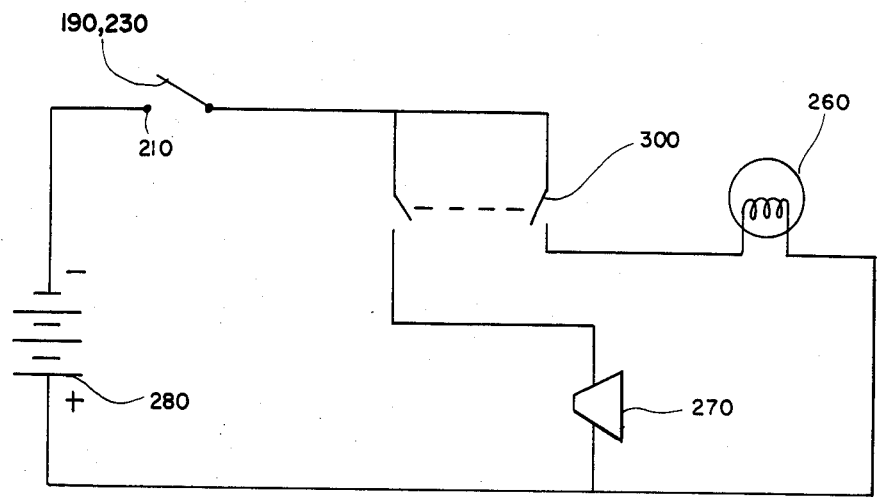
FIG. 7
FIG. 8
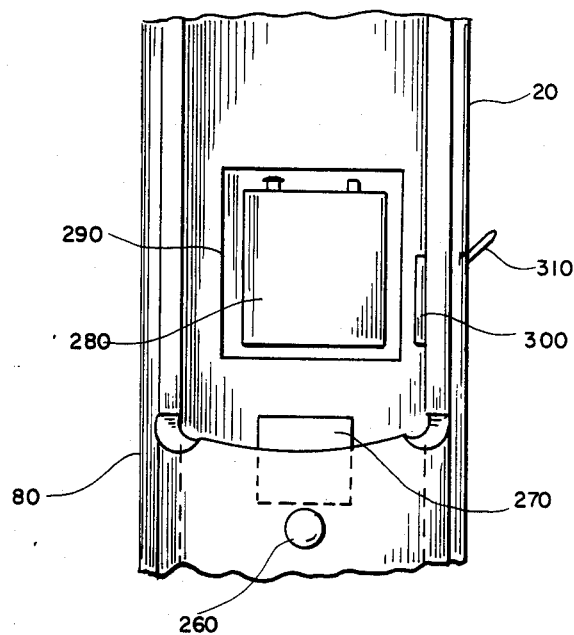

FISHING ROD HOLDER AND ALARM

INVENTION

Apparatus for supporting a fishing rod while it is being used in fishing is known and many types of apparatus and patents describing such apparatus are known. However, the apparatus of the present invention provides a holder which is simpler and more efficient and versativle than any known in the prior art. In addition, the present invention includes alarm apparatus for providing a signal when the fishing pole is moved by a fish and this alarm apparatus is not known or suggested in the art.

DESCRIPTION OF THE DRAWINGS

FIG. 1 is a front elevational view of the invention;

FIG. 2 is a sectional view of a portion of the apparatus shown in FIG. 1;

FIG. 3 is a sectional view along the lines 3—3 in FIG. 2:

FIG. 4 is a view of a portion of the rear of the apparatus of FIG. 1 showing apparatus embodying the invention;

FIG. 5 is a sectional view along the lines 5—5 in FIG. 4:

FIG. 6 is a view along the lines 6—6 in FIG. 4;

FIG. 7 is a schematic representation of a circuit used in the invention; and

FIG. 8 is a front elevational view of a portion of the apparatus of FIG. 1 showing mounting of portions of the circuit of FIG. 7.

DESCRIPTION OF THE INVENTION

A fishing pole holder 10 embodying the invention includes a hollow tubular member 20 having a pointed lower end which is adapted to be inserted into the ground or the sand adjacent to a body of water to be fished. The tubular member 20 has a portion of its wall removed from the upper end down a suitable distance, for example, to about its center where the wall of the tube is provided with one or more holes 40 in which hooks or other apparatus can be held for use as needed. The tube 20 is of plastic.

The tubular member 20 is provided with two pairs of aligned holes 50 and 60 near its lower end with the pairs of holes being on lines which are about at 90° to each other. Each set of holes receives a post 70 in a tight mechanical fit which the fisherman pushes on with his foot to push the tube 20 into the ground. The posts 70 stabilize the tube 20 and the entire assembly, to be described, in the ground. The tube 20 includes a plurality of holes 90 which are spaced apart vertically in the upper part thereof for engaging an annular ring or sleeve which is slidably mounted thereon and is adapted to support a fishing rod in a manner to be described.

The slidable ring 100 (FIGS. 2 and 3) includes a pair of aligned holes 122 and 123 which are opposite each other. A screw 120 is inserted through hole 122 into the ring and it is held in the ring by its head 130. The inner end of the screw is threaded into a plastic sleeve 140 which has, at its end, a pin 150 which extends through a hole 123 and a hole 90 in the tube 20. A spring 160 is threaded on the screw inside the sleeve and it is held in place between the inner wall of the ring and the plastic sleeve 140.

When the user pulls the screw head 130 to the right as seen in FIGS. 2 and 3, the sleeve 140 and its pin 150 are retracted and the pin is removed from hole 90 in tube 20. The ring 100 can now be slid up or down to a selected height on tube 20 to position the ring where desired and then the screw 120 is released to cause the pin 150 to seat in one of the holes 90 and this sets the ring at the desired position. Now the fishing rod can be inserted into tube 20 so that its lower end rests on the screw 120 and it is held in place thereby at the desired height (FIG. 3).

According to the invention, the fishing rod holder 10 can be provided with an alarm means to signal the fact that a fish has pulled on the bait and moved the fishing rod 110 held by the holder. For the alarm arrangement, a horizontal slice is removed from the wall of tube 20 near its upper end to leave a semicircular slot 170 in the wall. A plastic half-ring 180, having a smaller diameter than the tube 20 is seated in the cutout 170 and since its diameter is smaller than that of tube 20, it sits inwardly of the wall of the tube as seen in FIG. 4 and 5. The half-ring is provided with a hole 184 at about its center and a grommet 190 is seated in the hole. The half-ring is held in place by an insulating pin 200 which passes through the grommet and extends from just inside the half-ring to slightly outside the half-ring. An electrical wire 210 is secured to the grommet for a purpose to be described.

A vertical plate 220 is secured to the outer wall of the tube 20 at its upper end and extending across the cutout 170 by means of metal studs 250 and 251. The plate 220 has a hole aligned with the cutout 170 and a metal sleeve 230 is secured in the hole. A helical spring 240 is positioned inside the sleeve 230 and is held in place at its upper end by the end of a screw 241 which is threaded into the sleeve. The other end of the spring extends out of the end of the sleeve and engages the left end of the insulating pin 200 which is seated in the grommet and in the hole in the half-ring. The spring 240 thus biases the half-ring 180 and grommet 190 away from the inner end of the metal sleeve 230 which, as will be described below, represents a condition in which no fish has moved the pole and the half-ring and an electrical circuit is open and not conducting current.

A second wire 253 is secured to stud 250 and thus to the metal plate 220.

A rope shoulder sling is secured to the outer wall of tube 20 so that the tube can be carried on thes shoulder of the fisherman.

The two wires 210 and 253 form part of an electrical circuit which operates an alarm to signal when a fish moves the fishing pole. The alarm circuit (FIG. 7) includes a visual alarm light bulb 260 and an audible alarm or speaker 270 and is compactly seated in the tube 20. The alarm system includes a 9 volt battery 280 seated in a hoder 290 within the tube 20 and a small speaker 270 is also secured inside the tube to protect it. The bulb 260 is mounted so that it can be seen and protected. A small switch 300 is secured to the wall of tube 20 with its operating lever 310 accessible outside the tube 20. The battery 280 is connected to the speaker and the switch 300 is connected so that it can place the speaker or light in the circuit. In addition, the circuit is open excepts when a fish moves the rod and pulls the rod against the half-ring with sufficient force to push the half-ring 180 and its grommet 190 into contact with the end of the sleeve 230 and this connects the wires 210 and 253 together to cause an electrical short and this applies battery power to whichever alarm device is connected in the circuit. It is noted that the tension on the spring 240 and on the half-ring 180 is set by rotation of the screw 240 and the resultant tensioning of the spring 240 in the metal sleeve 230.

It is understood that proper insulating of parts is provided wher necessary.

What is claimed is:

1. A fishing rod holder comprising a tubular member having a pointed lower end which can be forced into the ground, said tubular member having a plurality of holes along its length, a ring slidably mounted on said tubular member, means associated with said ring for releasably securing said ring at selected positions along said tubular member by engaging a selected one of said holes, and means within said ring for supporting the end of a fishing rod inside said tubular member.

2. The device defined in claim 1 wherein said ring includes aligned opposed holes in the wall thereof and said means includes a spring-biased pin seated in one of said aligned holes and adapted to be inserted also into one of said holes in said tubular member to lock said ring in position on said tubular member.

3. The device defined in claim 1 and including signalling means for providing a signal when a fish is caught by the fishing rod and exerts a bending force thereon.

4. The device defined in claim 3 wherein said signalling means includes a slot in the wall of said tubular member, a section of a ring inserted in said slot in said wall, said ring being engaged by a fishing rod supported in said tubular member, a metal grommet, having an aperture, secured to said section of a ring, a wire secured to said grommet, another wire secured to said tubular member, an electrical circuit including a power source and an alarm means, said section of a ring being adapted to be moved by said fishing pole when grabbed by a fish to cause said grommet wire to operatively contact said other wire and cause a short circuit which connected said power source to said alarms means to operate said alarm means.

5. The device defined in claim 4 and including a vertical metal plate secured to said tubular member and positioned across said slot and in operative relation with said section of a ring and said metal grommet, said another wire being secured to said metal plate, a metal sleeve secured to said metal plate and positioned facing said grommet, an insulating pin within said sleeve and said grommet and spring-biased toward said section of a ring, a fish pulling on said a fishing rod in said tubular member forcing said section of a ring toward said sleeve and causing said sleeve to contact said grommet and complete an electrical circuit.

6. A fishing rod holder comprising a tube having a lower end adapted to be inserted into the ground and an upper end into which a fishing rod is to be inserted, an annular portion of the wall of said tube at said upper end being removed to provide an annular slot, a half ring, of smaller diameter that said tube, seated in said annular slot in the wall of said tube, a metal grommet in said half ring at about the center thereof, a metal plate secured to the outer wall of said tube and extending across said slot and having a hole disposed facing said half ring, a metal sleeve secured to said plate in said hole therein, and a screw in said sleeve and engaging a spring disposed therein, said spring carrying an insulating pin at its inner end facing said half ring and disposed within a hole in said grommet, said half ring bearing against said spring and riding on said insulating pin as a guide, said half ring being adapted to be pushed toward said sleeve when a fish pulls on the fishing rod carried in said tube, said movement of said half ring bringing said grommet into contact with said sleeve to cause a short circuit in an alarm circuit associated with said tube.

7. The apparatus defined in claim 6 and including an alarm circuit including a battery coupled to alarm means with an open circuit to said battern, and a lead connected to said grommet and a lead connected to said plate, said leads being operatively short-circuited when a fish moves said half ring to operatively short said leads together.

* * * * *